United States Patent [19]

Linn

[11] Patent Number: 4,813,462

[45] Date of Patent: Mar. 21, 1989

[54] APPARATUS FOR CONFINING AND REMOVING DUST AND OTHER DEBRIS FROM A WORK REGION OF A MACHINE TOOL

[75] Inventor: Thomas D. Linn, Holliston, Mass.

[73] Assignee: Boston Digital Corporation, Milford, Mass.

[21] Appl. No.: 36,286

[22] Filed: Apr. 9, 1987

[51] Int. Cl.⁴ ............................................. B23B 47/00
[52] U.S. Cl. ........................................ 141/93; 141/97; 141/65; 15/339; 408/67; 144/252 R
[58] Field of Search .......... 408/56, 67, 241 G, 241 R; 144/252 R; 141/65, 7, 66, 93, 97; 15/339

[56] References Cited

U.S. PATENT DOCUMENTS 3,837,383  9/1974  Ko ................................. 144/252 R
4,184,226  1/1980  Loevenich ....................... 15/339 X
4,296,523  10/1981 Clark ................................ 141/93 X
4,613,261  9/1986  Maier et al. ................. 144/252 R X

FOREIGN PATENT DOCUMENTS 2261297  6/1974  Fed. Rep. of Germany ... 144/252 R

Primary Examiner—Ernest G. Cusick
Attorney, Agent, or Firm—Lorusso & Loud

[57] ABSTRACT

An apparatus for containing carbon or other dust particles created during machining with rotating cutters such as drills or end mills includes a box fastened to the table of the machine tool, a pivoting lid with a hole to admit a spindle or other tool component into the box when the lid is closed and a vacuum system connected to the box to maintain a negative pressure within the box during cutting.

4 Claims, 2 Drawing Sheets

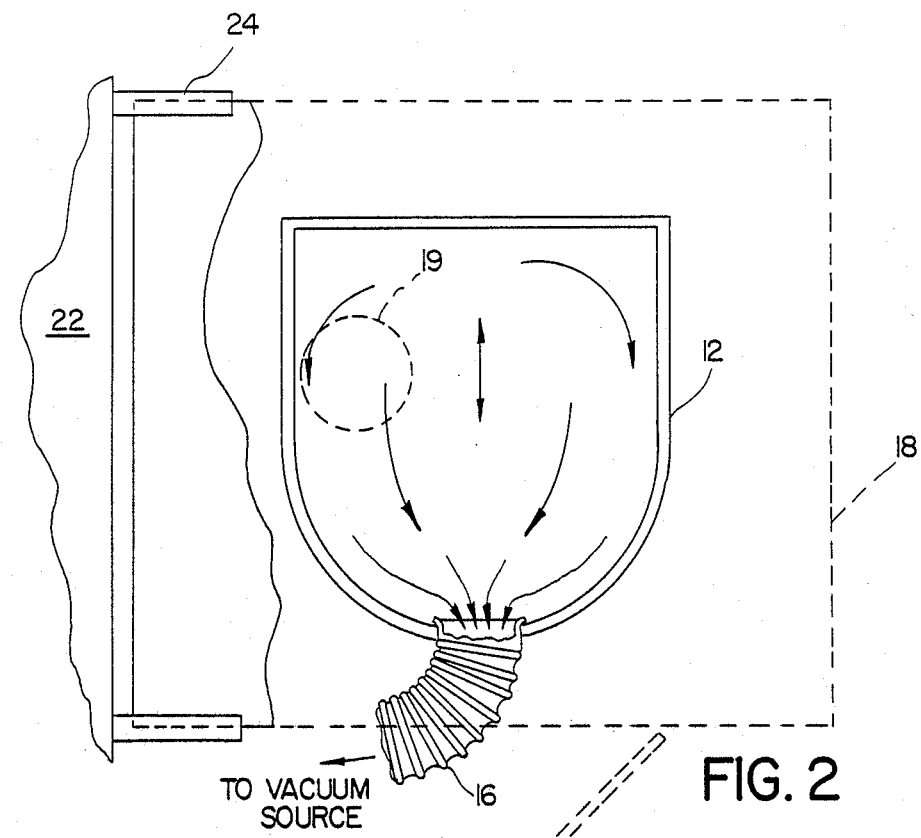
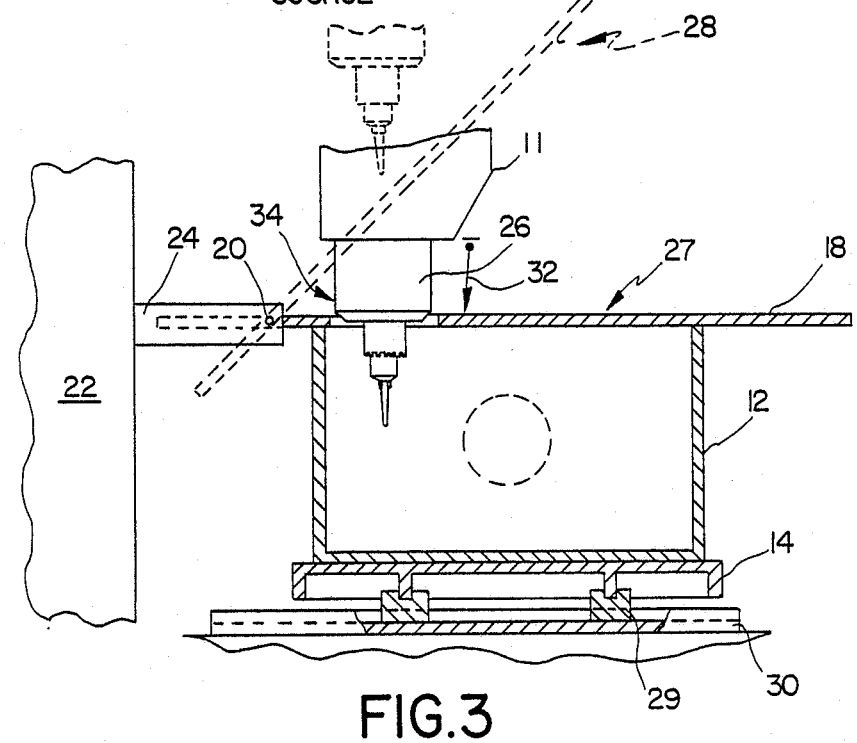

APPARATUS FOR CONFINING AND REMOVING DUST AND OTHER DEBRIS FROM A WORK REGION OF A MACHINE TOOL

BACKGROUND OF THE INVENTION

The present invention relates to machine tools, and more particularly to an apparatus for removing carbon particles and other dust within the immediate vicinity of the machining operation.

Carbon is one of the most common materials used for manufacturing EDM electrodes. These electrodes must be formed to the desired shape, and the electrodes are usually produced in a machining process. The most commonly used machines are milling machines or machining centers.

When carbon is machined, very fine chips and dust particles are produced which become airborne. Carbon dust is a health hazard and very abrasive. The abrasive nature of the dust quickly destroys vital mechanical elements of machine tools such as way systems, ballscrews, gears and other sliding or rolling elements.

Various devices have been tried to contain the carbon dust or limit damage to the various machine components. Elaborate and expensive, telescoping or bellows type covers can be installed to protect vital elements of the machine, and vacuum systems are usually employed close to the cutter but are never 100% successful in capturing all of the dust. A recent machine designed specifically to machine carbon uses both these techniques and in addition, totally encloses the machine in a housing and adds air curtains to direct the dust towards the vacuum inlets.

It is therefore a principal object of the present invention to provide an apparatus for containing carbon particles and dust within the vicinity of the cutter.

It is a further object of this invention to provide an apparatus for preventing the escape of dust from the vicinity of the cutter so as to prevent the dust from becoming a health hazard and making it unnecessary to protect the vital parts of the machine.

Another object of this invention is to provide a very economical and simply constructed apparatus for containing carbon dust or other hazardous dust particles.

SUMMARY OF THE INVENTION

An apparatus for containing carbon or other dust particles created during machining with rotating cutters such as drills or end mills includes a box fastened to the table of the machine tool, a pivoting lid with a hole to admit a spindle or other tool component into the box when the lid is closed and a vacuum system connected to the box to maintain a negative pressure within the box during cutting. The box is mounted on a way system and when moving on the way system the box remains covered by the large stationary lid mounted over the box.

These and other features and objects of the present invention will become apparent from the following detailed description which should be read in light of the accompanying drawings in which corresponding reference numerals refer to corresponding parts throughout the several views.

BRIEF DESCRIPTION OF THE DRAWINGS

FIG. 2 is a top plan view of the apparatus shown in FIG. 1;

FIG. 3 is a side elevational view, partly in section, of the apparatus shown in FIG. 1 shown in conjunction with a machine tool.

DETAILED DESCRIPTION OF THE PREFERRED EMBODIMENT

Figure 1:
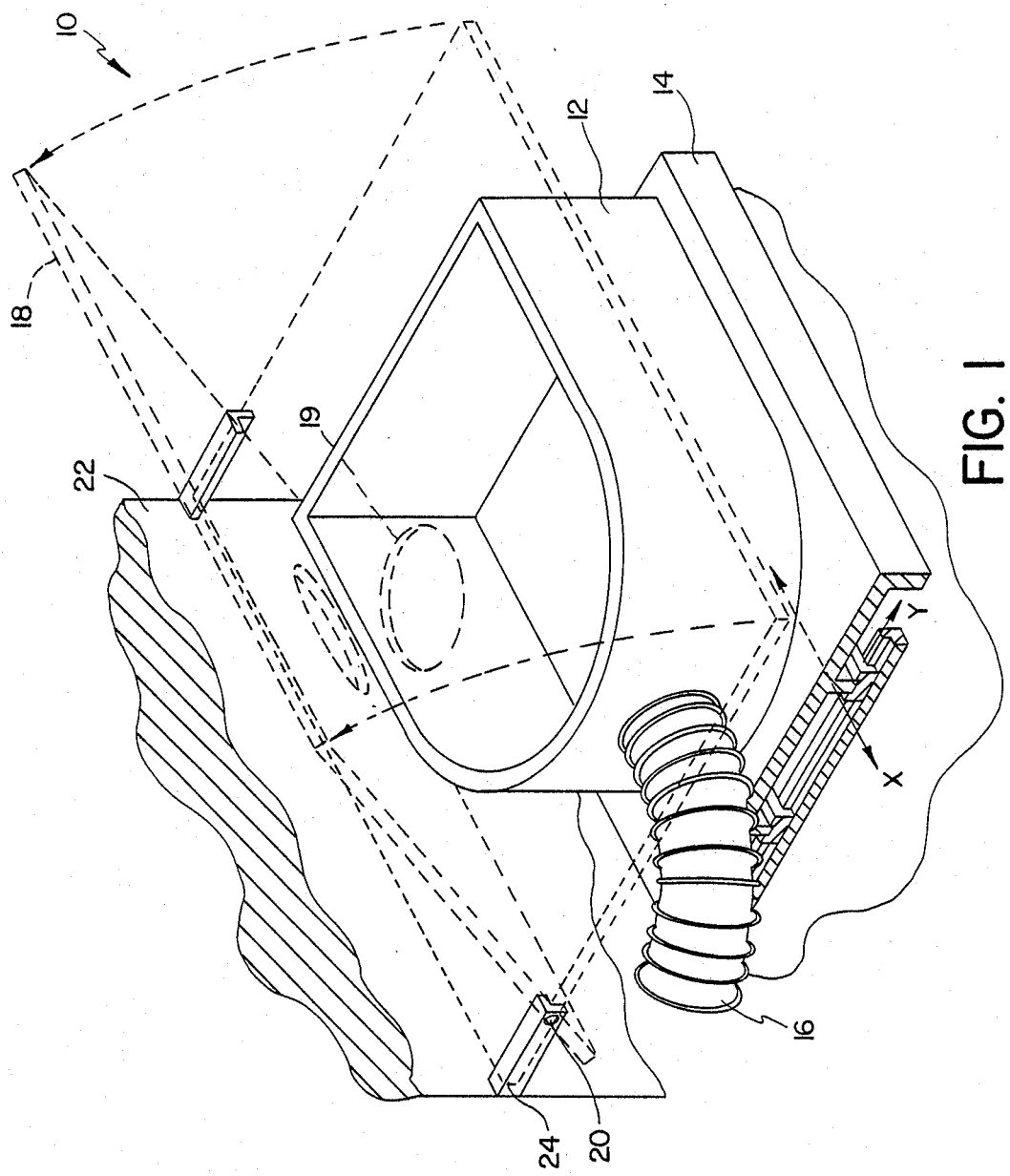
FIG. 1 is a perspective view of the apparatus for eliminating dust and other debris from a machining process of the present invention.

Referring to FIGS. 1 and 2, the apparatus 10 of the present invention is shown in use with a vertical spindle machine tool 11. The apparatus 10 includes a box 12 having an open top. The box 12 is secured to a table 14 of the machine tool, and the table 14 freely moves in the X and Y directions, as shown in FIG. 1, under program control. A vacuum hose 16, attached to the side of the box 12, connects a vacuum source (not shown) to the interior of the box.

A lid 18, which in a preferred embodiment is made of a clear durable material, such as Lexan which is sold by the General Electric Company, is pivotally mounted through pivots 20 at a rear edge of the lid to a column 22 by means of a pair of brackets 24. With the lid 18 attached to the column 22, the lid 18 maintains a fixed relationship with the spindle 26 in the X-Y plane when the lid 18 is in a closed position 27. The pivots 20 permit the lid 18 to open to position 28 for loading workpieces into the box 12. The lid 18 has X and Y dimensions that are greater than or equal to the X and Y dimensions of the box 12 plus the travel distances in the X and Y directions of the box 12. As a result, the lid 18 always covers the box 12 when the box 12 and table 14 move in the X and Y directions on the rails 29, 30 of a way system connected to the table 14.

In operation, a workpiece (not shown) is loaded into a fixture within the box 12 and the lid 18 is closed. The spindle 26 is then driven downward under program control into opening 19 of the lid 18. There is a small clearance between the opening 19 and the spindle to permit the spindle to move freely up or down through the distance 32 shown in FIG. 3. This spindle projection 34 is chosen so that its dimensions accommodate the working depth required by the tools and workpiece.

With the spindle 26 at or below the position shown in FIG. 3, and the vacuum sourced turned on, a negative pressure is created inside the box effectively preventing any dust from escaping. The small leakage around the opening 19, the top edges of the box 12 and other small gaps permit airborne dust particles within the box 12 to be carried off into the vacuum system. Heavy particles or chips simply fall into the box where they may be easily removed with a hand held hose from the vacuum system.

Although designed primarily for dust producing dry cutting, this invention also has application for flood or mist coolant cutting as well. When the apparatus is used in a wet cutting operation, the vacuum system would be of the wet or dry type. In such a system, the vacuum prevents the escape of mist or vapors from the work area, particualrly where the cutting fluid produces hazardous vapors. Swarf confinement to the box also makes it unnecessary to protect the machine itself from the swarf.

While the foregoing invention has been described with reference to its preferred embodiments, various alterations and modifications will occur to those skilled in the art. All such alterations and modifications are intended to fall within the scope of the appended claims.

What is claimed is:

1. An apparatus for confining small airborne dust particles, vapor, heavy particles, chips and other debris to a work region immediately surrounding a location where a machine cutting tool contacts a workpiece and for preventing the escape of dust particles or vapor from the work region to the worker's environment and for removing small airborne dust particles from the work region, said apparatus comprising:

a box surrounding the work region, said box having a bottom surface and side walls with the side walls constituting a perimeter sufficient to enclose the workpiece and the machine cutting tool and to contain the heavy particles, chips and other debris formed during a machining operation and to prevent their release to the worker's environment, said box being movable in two mutually perpendicular directions (x,y) which are within a plane perpendicular to the axis traveled by the machine cutting tool;

means for creating a negative pressure within said box;

a lid for enclosing the work region which has dimensions that are greater than or equal to the x and y dimensions of the box plus the travel distances in the x and y directions of the box, said lid being fixed to a member unconnected to the box and maintaining a fixed relationship with the machine cutting tool in the x and y plane when the lid is closed so that the lid always covers the box when the box moves in the x and y plane, said lid containing an opening configured to conform to the cross section of the portion of the machine cutting tool which passes through the opening during a cutting operation and which allows the machine cutting tool to pass through the lid in a direction perpendicular to said lid to enable work to be done on a workpiece when a workpiece is in said box while minimizing any loss of the negative pressure in said box, said box together with said lid confining heavy particles and chips, and said means for creating a negative pressure preventing the escape of dust particles or vapor from the work region to the worker's environment and removing small airborne dust particles or other debris from within said box.

2. The apparatus of claim 1 wherein said means for creating a negative pressure comprises a vacuum source connected to said box, said vacuum source creating a negative pressure within said box confining the dust particles and removing small airborne dust particles and other debris from within said box.

3. The apparatus of claim 1 wherein said lid is pivotally connected over said box so as to completely open said box to allow access to the work region within said box.

4. The apparatus of claim 1 wherein said lid is stationarily mounted with respect to the machine cutting tool so that as said box moves in two mutually perpendicular directions (x,y) which are within a plane perpendicular to the axis traveled by the machine cutting tool said box slides under said lid.

* * * * *